United States Patent

Kikuchi et al.

[15] 3,636,265

[45] Jan. 18, 1972

[54] TELEVISION CONFERENCE TELEPHONE SYSTEM

[72] Inventors: Masao Kikuchi, Tokyo; Toshihide Kawashima, Kawasaki-shi; Koichi Kasahara, Yokohama-shi; Saneyoshi Nagayoshi, Tokyo, all of Japan

[73] Assignee: Tokyo Shibaura Electric Co., Ltd., Kawasaki-shi, Japan

[22] Filed: Mar. 18, 1969

[21] Appl. No.: 808,068

[30] Foreign Application Priority Data

Mar. 22, 1968 Japan....................................43/18201
Mar. 22, 1968 Japan....................................43/18202

[52] U.S. Cl...........................................179/18 BC, 179/2 TV
[51] Int. Cl...........................................................H04m 3/56
[58] Field of Search...............179/1 CN, 1 UC, 2 TV, 18 BC; 178/5.6, 5.8, 6

[56] References Cited

UNITED STATES PATENTS 2,314,471 3/1943 Wright....................................179/2 TV
3,352,966 11/1967 Sawazaki et al. ....................179/2 TV
3,377,433 4/1968 Whitney ............................179/18 BC
2,644,039 6/1953 Rensch................................179/1 CN
2,871,291 1/1959 Hörner................................179/1 CN
3,191,066 6/1965 Staudenmayer.......................325/152
3,519,744 7/1970 Dorros et al.........................179/2 TV

*Primary Examiner*—Kathleen H. Claffy
*Assistant Examiner*—David L. Stewart
*Attorney*—Flynn and Frishauf

[57] ABSTRACT

In a conference telephone system utilizing a telephone exchange and terminal equipments, a television image transmitter and receiver are provided for each terminal equipment and the telephone exchange is provided with means to interconnect audio signal lines from subscribers attending a conference, and a video signal distributor to supply the video signal transmitted from a terminal equipment to all subscribers attending a conference.

12 Claims, 11 Drawing Figures

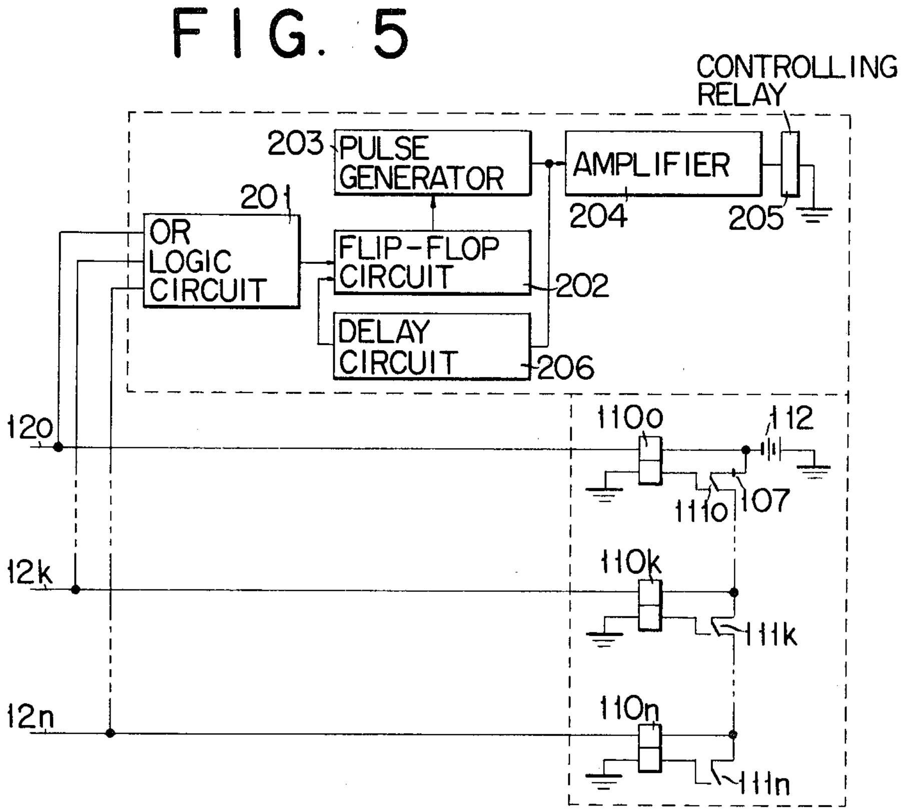
FIG. 5
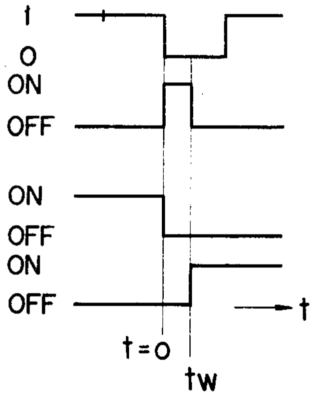
FIG.4 I FIG.4 II FIG.4 III FIG.4 IV

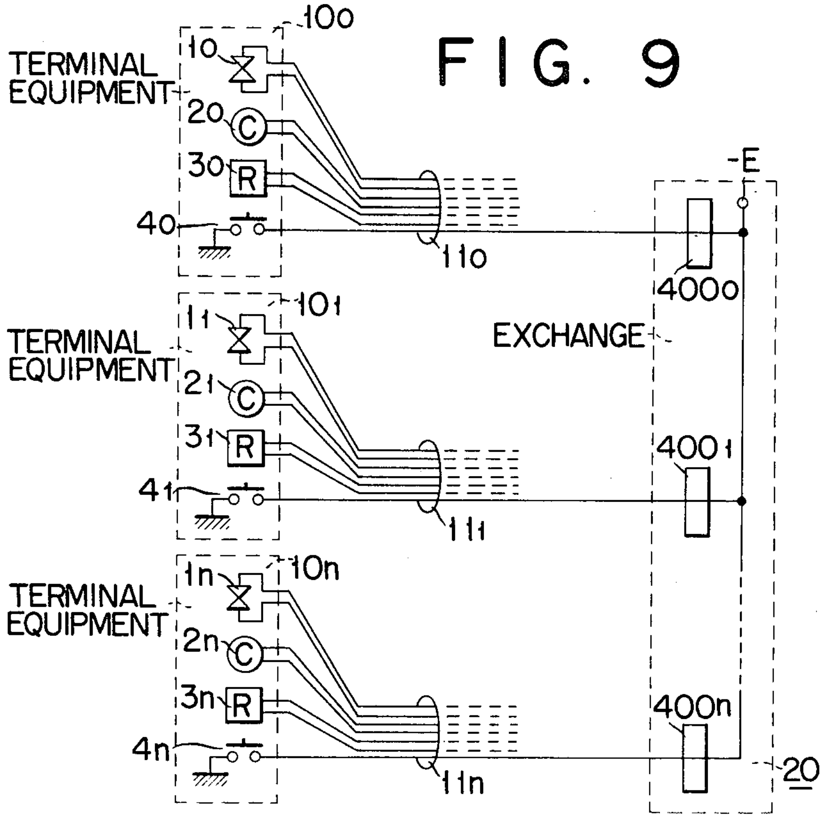
FIG. 9
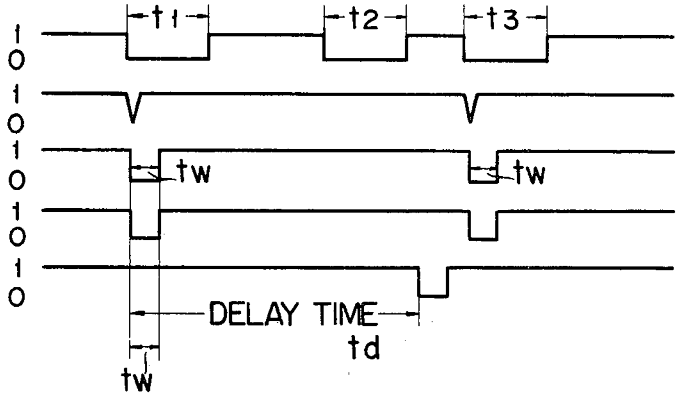
FIG. 6 I
FIG. 6 II
FIG. 6 III
FIG. 6 IV
FIG. 6 V

TELEVISION CONFERENCE TELEPHONE SYSTEM

This invention relates to a television conference telephone system wherein video signals and audio signals of respective subscribers are transmitted to subscribers included in the system.

Recently television telephone systems have been developed including a telephone exchange adapted to select and interconnect audio signal lines and video signal lines of a plurality of terminal equipments, each terminal comprising a television camera, a television receiver and a telephone set. However, a standard system of holding a conference with such a television telephone system is not yet established and is still in the course of development or experimentation. If such a television conference telephone system becomes available, subscribers at different locations can attend the conference whenever required. In addition, the subscribers can conduct the conference while viewing not only the expression and attitude of the attendants but also various data, charts or articles. This feature could never have been realized by conventional conference telephone systems utilizing voices alone.

In the known conference telephone system utilizing the voice alone of the attendants, it is sufficient to merely connect all subscribers attending the conference to the same telephone line. This is because each subscriber restrains from speaking while another subscriber is speaking. Thus, actually only one subscriber or attendant speaks at a time. On the other hand, in a television conference telephone system images of all subscribers attending the conference are displayed in superposed relationship on the screen of a television receiver at each subscriber. Consequently, in such a system it is necessary to selectively connect the video signal sending lines of respective subscribers attending the conference, and if required, also the video signal receiving lines to the system according to a prescribed rule.

It is an object of this invention to provide a television conference telephone system capable of displaying the image of a particular subscriber among a plurality of subscribers attending the conference on television receivers of all such subscribers.

A further object of this invention is to provide a television conference telephone system wherein each talking subscriber or attendant can properly monitor its own condition and can ascertain whether the presented charts or data and the like are properly displayed or not.

A still further object of this invention is to provide a television conference telephone system wherein the video signal of a subscriber can be sequentially switched at a predetermined interval.

A object of this invention is to provide a television conference telephone system wherein an image of a particular subscriber can be locked by a simple operation.

SUMMARY OF THE INVENTION

Briefly stated, in accordance with this invention there is provided a television conference telephone system comprising a plurality of terminal equipments adapted to transmit and receive audio signals and video signals, means to connect to the conference telephone system terminal equipments of subscribers attending the conference, selector means corresponding to said plurality of terminal equipments, control logical means operating only the selector means corresponding to the terminal equipment of a particular subscriber attending the conference, and video signal distributing means which is responsive to the selector means to supply the video signal of only a particular subscriber to television receivers of terminal equipments of all subscribers attending the conference.

This invention can be more fully understood from the following detailed description when taken in connection with the accompanying drawings, in which:

FIG. 4 is a chart to explain the operation of the select control circuit shown in FIG. 3;

FIG. 5 shows a connection diagram of a modified select control circuit;

FIG. 6 is a chart to explain the operation of the modified select control circuit shown in FIG. 5;

FIG. 9 shows the connection between respective terminal equipments and control relays for controlling the modified select control circuit shown in FIG. 8.

Generally, the attitude of the attendants in a conference is such that while one of them is speaking, others are listening to him while looking at him. A particular embodiment of this invention to be disclosed hereinafter utilizes this fact. More particularly, each terminal equipment is provided with means to indicate the intention of a subscriber to speak. Video signals of subscribers who have indicated such an intention to speak are selected according to the order of their preference (or priority) to display the video signal of a selected subscriber on the television receivers of all subscribers.

Figure 1:
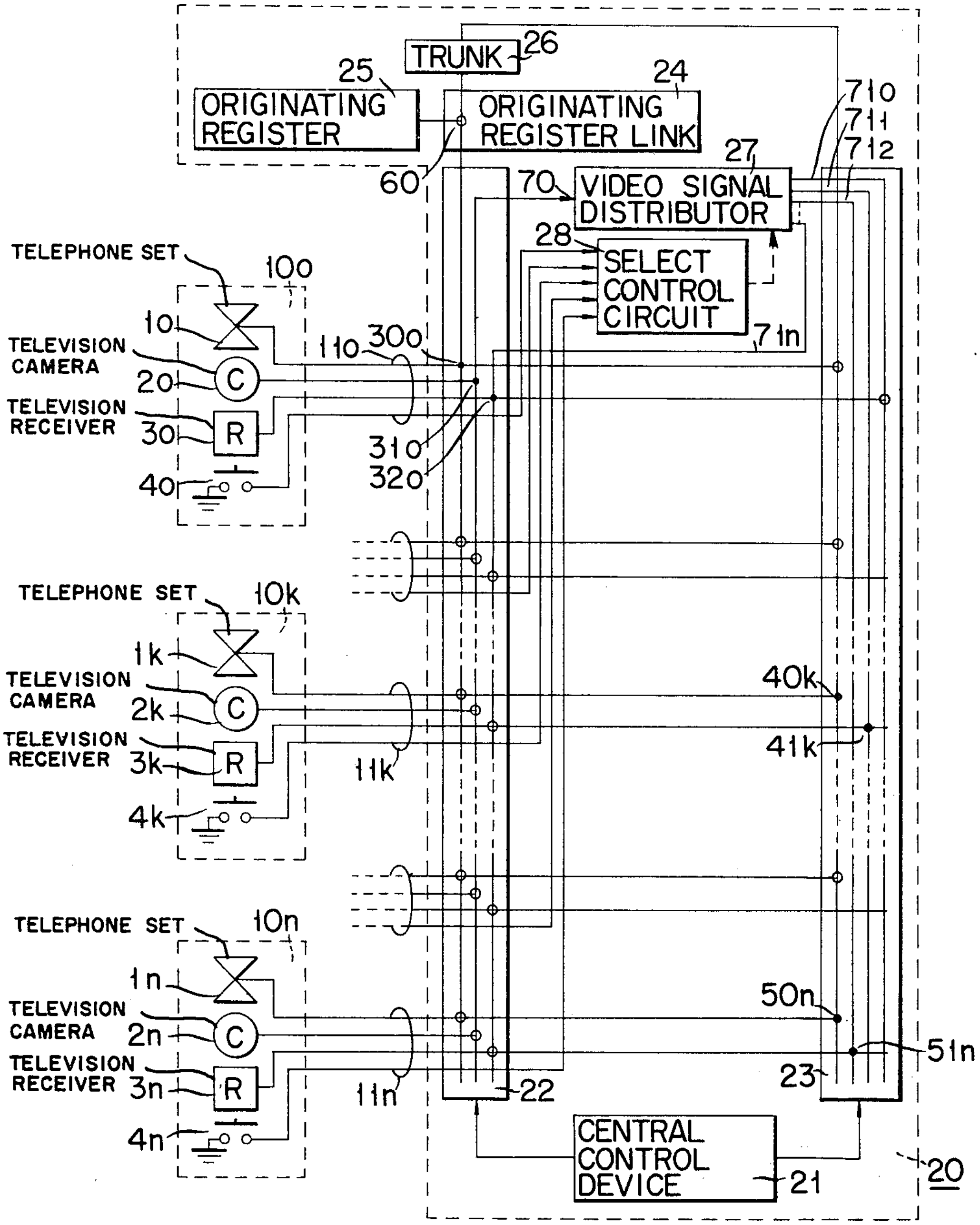
FIG. 1 shows a connection diagram of the entire television conference telephone system embodying this invention.

As diagrammatically illustrated in FIG. 1 respective terminal equipments $10_0$...$10_k$...$10_n$ of respective subscribers comprise telephone sets $1_0$...$1_k$...$1_n$; television cameras $2_0$...$2_k$.. $2_n$; and push buttons $4_0$..., $4_k$....$2_n$; and push buttons $4_0$..., $4_k$.... and $4_n$. Lines $11_0$....$11_k$...$11_n$ from these terminal equipments are connected to an originating line link frame 22 of a telephone exchange 20. Like a standard telephone exchange, the telephone exchange 20 comprises a central control device 21, an originating line link frame 22, a terminating line link frame 23, an originating register link 24, an originating register 25, and a trunk 26. A video signal distributor 27 for effecting connection of video signal lines and a select control circuit 28 for controlling video signal distributor 27 are also included in the telephone exchange. For the sake of simplicity, in FIG. 1 an independent talking line and a control line or two conductors are indicated by a single line or conductor, cross points are represented by simple symbols, i.e., small blank circles (break) and small black circles (make) and cross point relays are omitted from the drawing.

In a conventional automatic telephone exchange a conference connection can be established by only connecting in parallel all subscribers attending the conference to the same audio signal line while in a telephone exchange of a television telephone system, the conference connection of audio signal lines mentioned above and video signal lines are made simultaneously. In the following, the conference connection of audio signal lines is firstly considered and then that of television lines.

As is well known in the art, the conference connection of audio signal lines is established in the central control device 21. When a call is made by a subscriber utilizing terminal equipment $10_0$ who organizes the conference, the call is detected by a line relay (not shown) of originating line link frame 22 and the detected information is transmitted to the central control device 21. In response to this information, central control device 21 causes a cross point relay to close the cross points $30_0$ and 60 of originating line link frame 22 and originating register link 24, respectively, so as to connect the audio signal line of terminal equipment $10_0$ to an originating register 25. Then, dial signals are transmitted from telephone set $1_0$ of terminal equipment $10_0$ to originating register 25 and decoded by it. When the decoded information is transmitted to central control device 21, originating register link 24 and originating register 25 are reset.

The above described information acts as a conference connection information. If it is assumed now that attendants to the conference are subscribers employing terminal equipments $10_k$ and $10_n$, the central control device 21 will close cross points $40_k$ and $50_n$ or terminating line link frame 23. Thus, the central control device 21 resets after confirming the response of subscribers. Since the connection between trunk 26 and terminal equipment $10_0$ has already been established, the connection of the audio signal line will be completed through the following route.

telephone set $1_0$ of terminal equipment $10_0$ → cross point $30_0$ of originating line link frame 22 trunk 26 ┐

→ cross point $40_k$ of terminating line link frame 23 → telephone set $1_k$ of terminal equipment $10_k$.
→ cross point $50_n$ of terminating line link frame 23 → telephone set $1_n$ of terminal equipment $10_n$.

Let us now consider the television line. Television cameras $2_0$....$2_k$....$2_n$ of respective terminal equipments $10_0$....$10_k$....$10_n$ are connected to an input terminal 70 of the video signal distributor 27 respectively through cross points of originating line link frame 22. These cross points are arranged to be closed by selector relays of select control circuit 28 to be described later. Television receivers $3_0$....$3_k$....$3_n$ of respective terminal equipments $10_0$....$10_k$....$10_n$ are connected to output terminals $71_1$, $71_2$ ...$71_n$, respectively of video signal distributor 27 respectively through cross points or originating line link frame 22 and terminating line link frame 23. These cross points are arranged to be closed respectively by cross point relays of the originating line link frame 22 and of terminating line link frame 23. In the above described audio signal lines when a handset (not shown) of telephone set $1_0$ is taken up by the subscriber belonging to terminal equipment $10_0$, its television camera $2_0$ and television receiver $3_0$ are connected to a suitable source of power, not shown. When central control device 21 detects this call by appropriate cross point relays, cross points $30_0$ and $32_0$ will be closed so that the television receiver $3_0$ of terminal equipment $10_0$ will be connected to an output terminal $71_n$ of the video signal distributor 27. Further, as the central control device 21 operates cross point relays of terminating line link frame 23, cross points $40_k$, $41_k$ and $50_n$, $51_n$ will be closed. This connects television receiver $3_k$ of terminal equipment $10_k$ to an output terminal $71_0$ of the video signal distributor 27 and connects television receiver $3_n$ of terminal equipment $10_n$ to an output terminal $71_1$ of the video signal distributor in the same manner. When the subscriber belonging to terminal equipment $10_0$ depresses switch $4_0$ under this condition or immediately after taking up the handset of telephone set $1_0$ a selector relay of select control circuit 28 to be described later in detail will operate to close cross point $31_0$ of the originating line link frame 22 whereby to complete the connection of the television line via the following route:

television camera $2_0$ of terminal equipment $10_0$ → cross point $31_0$ of originating line link frame 22 → video signal distributor 27 ┐

→ cross point $41_k$ of terminating line link frame 23 → television receiver $3_k$ of terminal equipment $10_k$.
→ cross point $51_n$ of terminating line link frame 23 → television receiver $3_n$ of terminal equipment $10_n$.
→ cross point $32_0$ of originating line link frame 22 → television receiver $3_0$ of terminating equipment $10_0$.

In this manner, the video signal produced by television camera $2_0$ belonging to terminal equipment $10_0$ is supplied not only to television receivers $3_k$ and $3_n$ of subscribers attending the conference through video signal distributor 27 but also to its own receiver $3_0$. Accordingly, the talking subscriber can monitor his condition and at the same time can monitor whether the presented chart, data or the like are properly displayed or not.

Figure 2:
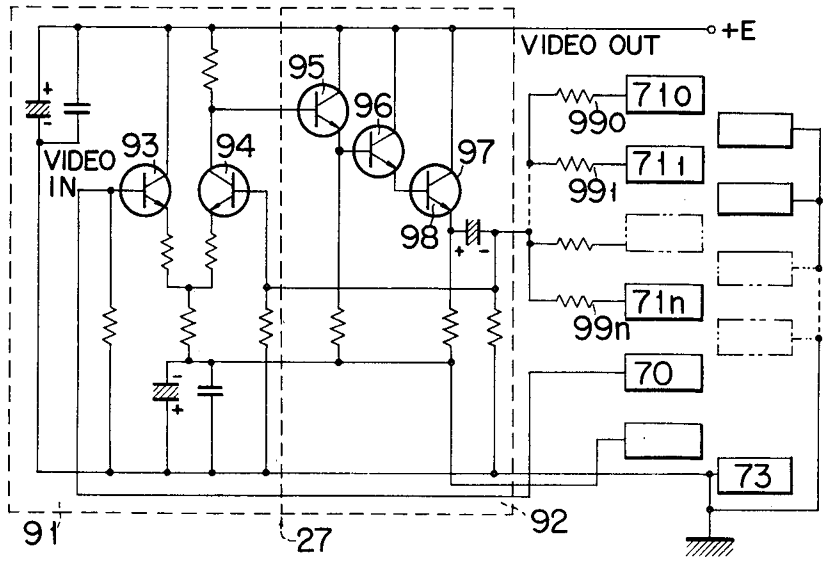
FIG. 2 shows the detail of the electrical connection of the video signal distributor shown in FIG. 1.

The video signal distributor 27 will now be described in detail with reference to FIG. 2. More particularly, the video signal distributor comprises a differential amplifier 91 and an impedance converter 92. The video signal impressed across input terminals 70 and 73 of the video signal distributor is amplified by a differential amplifier including transistors 93 and 94. The impedance of differential amplifier 91 as seen from input terminals 70 and 73 of video signal distributor 27 is selected to be equal to the impedance of the video signal line connected across input terminals 70 and 73. The output signal from differential amplifier 91 is coupled to impedance converter 92 in the succeeding stage through the collector electrode of the transistor 94, the impedance converter 92 being comprised by cascade connected transistors 95, 96 and 97. Transistor 97 is connected in an emitter follower configuration including a plurality of output terminals $71_0$, $71_1$...$71_n$. Between the emitter electrode 98 of transistor 97 and output terminals $71_0$, $71_1$ ... $71_n$ are connected resistors $99_0$, $99_1$ ... $99_n$, respectively having the same resistance values as the characteristic resistances of the video signal lines connected to these output terminals. Impedance converter 92 operates to match the impedance of video signal lines connected to output terminals $71_0$, $71_1$ ... $71_n$ and the impedance of the video signal distributor 27 as seen from output terminals $71_0$, $71_1$ ... $71_n$. Further the impedance converter 92 amplifies the video signal supplied to input terminal 70. Thus, video signal distributor 27 amplifies the video signal supplied to input terminal 70 and transmits the amplified signal to a plurality of video signal line which are connected to output terminals $71_0$, $71_1$ $71_n$ without any accompanying loss due to mismatch or interference between the input video signal and output video signal.

Figure 3:
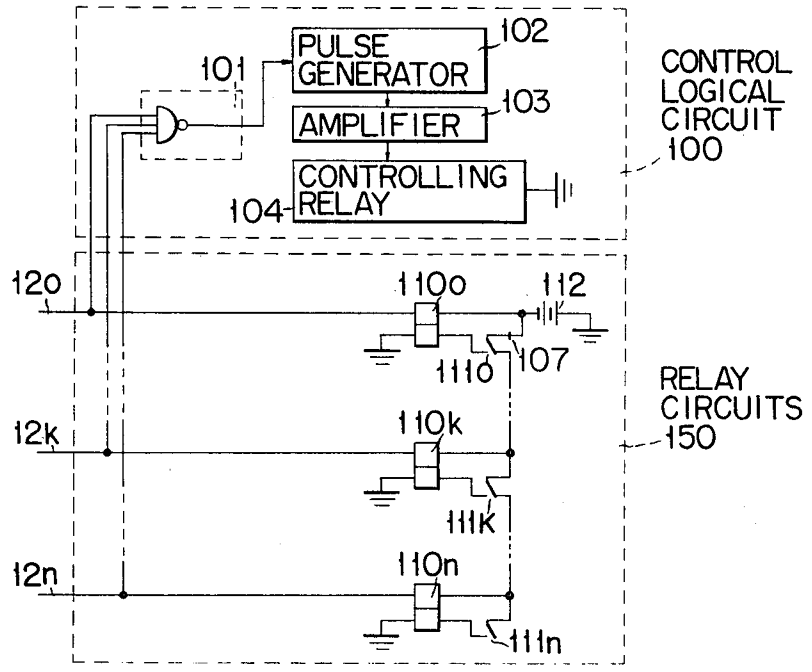
FIG. 3 shows a connection diagram of a select control circuit shown in FIG. 1.

FIG. 3 shows an example of a select control circuit utilized for video signal distributor 27. The select control circuit comprises a relay circuit 150 and a control logical circuit 100. The relay circuit 150 includes selector relays $110_0$ ... $110_k$ ... $110_n$, corresponding to terminal equipment $10_0$ ... $10_k$ ... $10_n$, respectively. One end of each of the operating coils of selector relays $110_0$ ... $110_k$ ... $110_n$ are connected to speech indicating lines $12_0$ ... $12_k$ ... $12_n$ extending from push buttons $4_0$ ... $4_k$ ... $4_n$ of terminal equipment $10_0$ ... $10_k$ ... $10_n$. The other end of the operating coil of selector relay $110_0$ is grounded through source 112. The other end of each of the operating coils of other selector relays is connected to the source 112 via transfer contacts of selector relays connected to input terminal 70 of video signal distributor and having a higher degree of preference of earlier order of operation and a break contact 107 of a control relay 104 of control logical circuit 100 (see FIG. 3). The holding coil of the selector relay is connected to the source through its transfer contact, the transfer contact of a relay of higher degree of preference and break contact 107 of control relay 104.

As shown in FIG. 3, the logical control circuit 100 comprises a NAND-circuit 101 with its inputs respectively connected to speech indicating lines $12_0$ ... $12_k$ $12_n$ a pulse generator 102, an amplifier 103 and a control relay 104.

In this embodiment, when one of the subscribers depresses a pushbutton, NAND-circuit 101 provides an output to cause pulse generator 102 comprised by a monostable multivibrator, for example, to generate a pulse of a width $tw$, which is set to be shorter than the interval of time $t$ during which the pushbutton is being depressed. This pulse is amplified by amplifier 103 drive control relay 104. Accordingly, control relay 104 operates for an interval $tw$ each time the subscriber depressed his pushbutton to deenergize relay circuit 150 by its break contact 107. Assuming that the subscriber belonging to terminal equipment $10_0$ has depressed push button $4_0$ for speaking, control relay 104 is operated for a predetermined interval $tw$ to deenergize relay circuit 150 by its break contact 107. Since the pushbutton is still being in the depressed state, after elapse of said predetermined interval $tw$ the operating coil of selector relay 110is energized to close its transfer contact whereby the selector relay $110_0$ will be energized by its self-holding circuit. This causes closing of cross point $31_0$ of the originating line link frame 22 to connect video signal line $2_0$ connected to the television camera of the terminal equipment $10_0$ to input terminal 70 of video signal distributor 27 (see FIG. 1). Thus, the video signal from terminal equipment $10_0$ is supplied to television receivers $3_0$ ... $3_k$ ... $3_n$ of terminal equipments of all subscribers attending the conference. In this manner the image only of a particular attendant or subscriber is displayed on the television receivers of all of the subscribers attending the conference.

The operation of a case wherein another subscriber depresses its pushbutton when the image of a particular subscriber is being displayed on respective television receivers will now be considered with reference to a chart shown in FIG. 4. Let us consider a condition wherein the subscriber belonging to terminal equipment $10_n$ depresses pushbutton $4_n$ when selector relay $110_k$ of terminal equipment $10_k$, for example, is in the operated state.

The waveform I in FIG. 4 shows the operation of pushbutton $4_n$ wherein the depressed state thereof which is caused by the subscriber belonging to the terminal equipment and intending to speak is represented by "0" whereas the released state of pushbutton $4_n$ is represented by "1." The wave forms II, III and IV represent on-off operations of control relay 104, selector relay $110_k$ and selector relay $110_n$, respectively.

Assuming now that the subscriber belonging to terminal equipment $10_n$ has depressed pushbutton $4_n$ at a time $t=0$ under conditions where the image of the subscriber belonging to terminal equipment $10_k$ is being displayed on all television receivers. Then, break contact 107 of control relay 104 is opened to interrupt the self-holding circuit of selector relay $110_k$ so that the image of the subscriber belonging to terminal equipment $10_k$ will disappear from respective television receivers. After an interval $tw$ when control relay 104 is deenergized as pushbutton $4_n$ is still being in its depressed state selector relay $110_n$ is operated to close its self-holding circuit thereby displaying the image of the subscriber belonging to terminal equipment $10_n$ on respective television receivers.

Let us now consider a condition wherein two or more subscribers of attendants to the conference simultaneously depress the pushbuttons. For example, where subscribers belonging to terminal equipments $10_k$ and $10_n$ simultaneously depress pushbuttons $4_k$ and $4_n$, following operations are performed. More particularly, control relay 104 of the control logical circuit 100 is operated to interrupt relay circuit 150 and selector relays $110_k$ and $110_n$ tend to operate simultaneously. Under these circumstances, upon completion of the operation and self-holding of selector relay $110_k$, the transfer contact $111_k$ thereof opens a circuit connecting selector relay $110_n$ to the source, thus rendering inoperative selector relay $110_n$. This means that selector relay $110_k$ has a higher degree of preference (that is, a higher priority) than selector relay $110_n$. Consequently, according to this embodiment, by the depression of pushbuttons, switching of images can be made frequently.

FIG. 5 illustrates a modified embodiment of the input control circuit for the image distributor 27. The select control circuit includes a relay circuit 150, and a control logical circuit 200. The construction of relay circuit 150 is identical to that shown in FIG. 3 whereas control logical circuit 200 comprises an OR-circuit 201, a flip-flop circuit 202, a pulse generator 203, a delay circuit 206, an amplifier 204 and a control relay 205. OR-circuit 201 is connected with speech indicating lines $12_0$ ... $12_k$ ..$12_n$ from pushbuttons $4_0$ ... $4_k$ ... $4_n$ of terminal equipments $10_0$ ... $10_k$ ... $10_n$. Thus, for example, when the subscriber belonging to terminal equipment $10_0$ depresses pushbutton $41_0$, an output is supplied by OR-circuit 201 and the flip-flop 202 is set by the trailing edge of this output. The set signal of flip-flop 202 triggers pulse generator 203 to cause it to generate a pulse having a predetermined pulse width $tw$. This pulse is amplified by amplifier 204 to drive control relay 205 for an interval determined by the pulse width $tw$. After being delayed for a predetermined interval $td$ by means of the delay circuit 206, the output pulse from pulse generator 203 is also applied to flip-flop circuit 202 to reset the same. In this embodiment, just as in the above embodiment shown in FIG. 3, the image alone of a particular attendant can be displayed on the television receivers of all attendants.

FIG. 6 is a graph showing signal wave forms at various parts of control logic circuit 2 when different subscribe depress pushbuttons at the same time. The wave form I shows the operating state of the pushbutton of a terminal equipment in which the released state of the pushbutton is represented by "1" and the depressed state is by "0." The wave form II shows an output signal from flip-flop circuit 202, the waveform III that from pulse generator 203, the waveform IV the operating condition of control relay 205, and the wave form V an output signal from delay circuit 206. When the subscriber belonging to terminal equipment $10_0$, for example, depresses pushbutton $4_0$ for an interval $t_1$ control relay 205 will be operated for the interval $tw$. Then after a certain time interval if the subscriber of another terminal equipment $10_k$ depresses push button $4_k$ for an interval $t_2$, so long as the sum of intervals $t_1$ and $t_2$ and the interval between $t_1$ and $t_2$ is shorter than the delay time $td$ of the delay circuit 206, the flip-flop circuit 202 would not be reset and hence control relay 205 would not be operated. During an interval wherein flip-flop circuit 202 is held in its reset state by a pulse delayed by delay circuit 206 when the subscriber belonging to terminal equipment $10_n$ depresses pushbutton $4_n$ for an interval $t_3$, a pulse of width $tw$ from pulse generator 203 will be amplified by amplifier 104 to actuate control relay 205 for the interval $tw$ whereby the image to be displayed on television receivers is switched from the subscriber belonging to terminal equipment $10_0$ to the subscriber belonging to terminal equipment $10_n$. Consequently, the image of the subscriber belonging to terminal equipment $10_0$ is displayed on all television receivers for the delay time $td$ provided by delay circuit 206 and within this delay time there is no fear that his image might be switched to the image of the subscriber of another terminal equipment.

Where any two subscribers depress pushbuttons at the same time, the operation of the system is identical to that already has been discussed in connection with the embodiment shown in FIG. 3.

Even when all subscribers or attendants to the conference depress their pushbuttons, since OR-circuit 201 is included in this embodiment control relay 205 operates in such a a manner that the image of the subscriber belonging to a particular terminal equipment corresponding to the selector relay of the highest degree of preference is displayed.

While in FIGS. 3 and 5, embodiments employing a NAND circuit and an OR circuit, respectively are illustrated, as these two circuits are essentially identical, an OR circuit may be used in the embodiment shown in FIG. 3 and a NAND circuit in the embodiment shown in FIG. 5.

Figure 7:
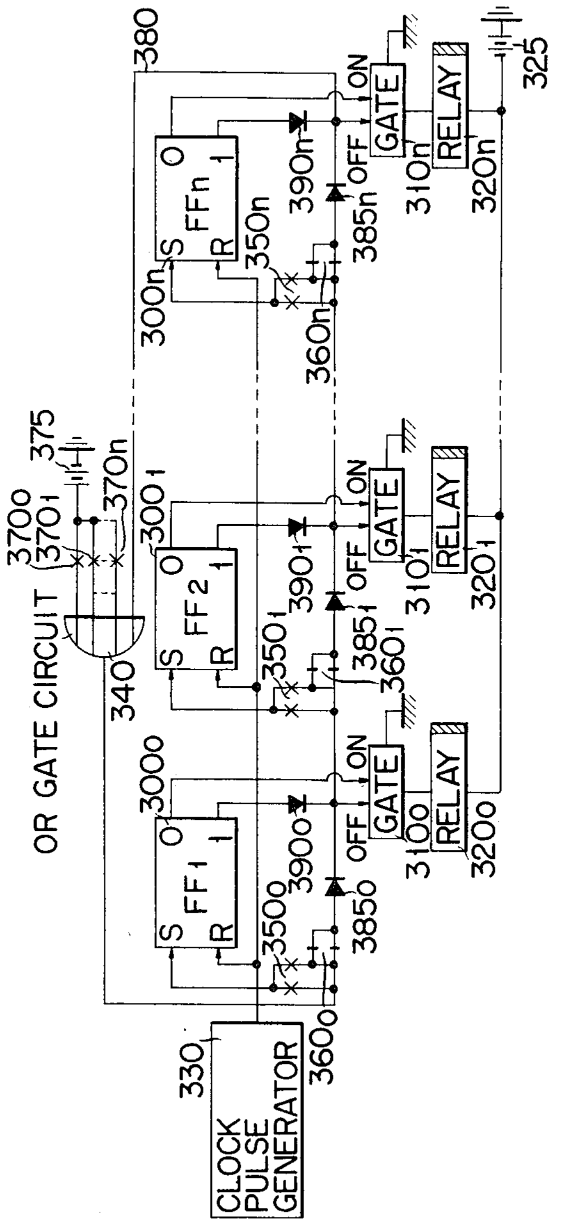
FIGS. 7 and 8 show connection diagrams of further modifications of the select control circuit.

A still further embodiment of the select control circuit is illustrated in FIG. 7. The select control circuit shown in FIG. 7 is constructed such that during talking of a subscriber attending the conference the video signal of that subscriber is successively switched with a predetermined period. The select control circuit comprises flip-flop circuits $300_0$, $300_1$ ... $300_n$ corresponding to respective subscribers, gate circuits $310_0$, $310_1$ ... $310_n$, selector relays $320_0$, $320_1$ ... $320_n$ that reset with a time delay a clock pulse generator 330 and an OR-gate circuit 340. In order to control the starting of the operation of this select control circuit the input terminals of OR-gate circuit 340 are connected to a source 375 via make contacts $370_0$, $370_1$ ... $370_n$ which are closed by cross point relays of the originating line link frame and also to a negative feedback line 380 to the $n$th flip-flop circuit $300_n$. The output conductor of OR-gate circuit 340 is connected to the set terminal of the first flip-flop circuit $300_0$ through parallel make contacts $350_0$ which are closed by the cross point relays of the originating line link frame and terminating line link frame. The output conductor of OR-gate circuit 340 is also connected to the off terminal of a gate circuit $310_0$ and to the succeeding flip-flop circuit $300_1$ through break contacts $360_0$ which are opened by the cross point relays of the originating line link frame and of the terminating line link frame, and a blocking diode $385_0$.

The "1" output terminal of flip-flop circuit $300_0$ is connected to the off terminal of gate circuit $310_0$ through a diode $390_0$ while the "0" output terminal of the flip-flop circuit to the on terminal of gate circuit $310_0$. The output terminal of gate circuit $310_0$ is connected to a source of supply 325 via a selector relay $320_0$. A pulse generator 330 is coupled to the reset terminals R of respective flip-flop circuit $300_0$, $300_1$ ... $300_n$. The circuits of the first to nth selector relays $320_1$ to $320_n$ are identical to that of the 0th selector relay $320_0$.

The select control circuit shown in FIG. 7 operates as follows:

When a subscriber organizing the conference, for example, the subscriber of the 0th terminal equipment calls, make contact $370_0$ of the originating line link frame will be closed. As a result, voltage is applied from source 375 to the 0th flip-flop circuit $300_0$ through OR-gate circuit 340 and through make contact $350_0$ to set flip-flop circuit $300_0$. Upon setting, this flip-flop circuit supplies a signal to the on terminal of gate circuit $310_0$ from "0" terminal, to enable gate circuit $310_0$ so as to operate selector relay $320_0$. In this manner, the video signal line of the subscriber organizing the conference is connected to the input terminal of the video signal distributor.

It is assumed now that 0th, first and nth subscribers are in the conference talking condition and that selector relay $320_0$ is in its operated condition so that the image of the 0th subscriber is being displayed on the television receivers of respective subscribers. Under these conditions application of a clock pulse from clock pulse generator 330 to flip-flop circuit $300_0$ causes the same to reset. As a result, the gate circuit $310_0$ is disenabled and selector relay $320_0$ stops its operation. A "1" signal from flip-flop circuit $300_0$ is applied to the set terminal of the first flip-flop circuit $300_1$ through diode $390_0$ and make contact $350_1$ to set flip-flop circuit $300_1$. Then a "0" signal is applied to gate circuit $310_1$ from flip-flop circuit $300_1$ to enable the gate circuit so as to operate selector relay $320_1$. Flip-flop circuit $300_1$ is reset by the next succeeding clock pulse from the clock pulse generator 330 whereby selector relay $320_1$ stops its operation. A "1" signal from this flip-flop circuit $300_1$ is applied to flip-flop circuit $300_n$ through diode $390_1$ and through make contact $350_n$. As a result a "0" signal is supplied by this flip-flop circuit $300_n$ to enable gate circuit $310_n$ to operate selector relay $320_n$.

In this manner, respective selector relays $320_0$, $320_1$ and $320_n$ are repeatedly energized and deenergized by successive clock pulses from the clock pulse generator 330. Consequently, images of respective attendants are successively displayed on the television receivers of all subscribers attending the conference. Thus, this select control system enables each subscriber to view conditions of all subscribers.

Figure 8:
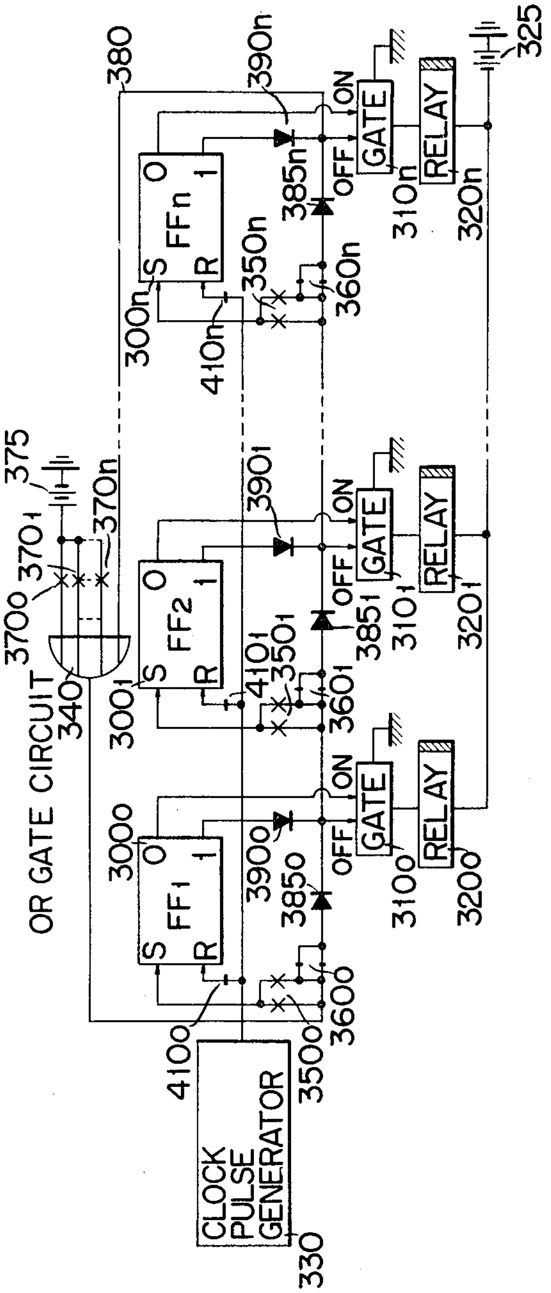

FIGS. 8 and 9 illustrate a modified select control circuit which can effect the image switching operation as above described and wherein the image can be locked when a subscriber depresses his pushbutton. Although respective terminal equipments $10_0$, $10_1$ ... $10_n$ are identical to those shown in FIG. 1, the telephone exchange 20 is provided with relays $400_0$, $400_1$ ... $400_n$ shown in FIG. 9 which are operated when pushbuttons $4_0$, $4_1$ ... $4_n$ of respective terminal equipments $10_0$, $10_1$ ... $10_n$ are depressed. Although not shown in the drawings, these pushbuttons are provided with self locking mechanism or constructed to act as double action switches so that when they are once depressed they are automatically locked in their operated state and unlocked when depressed again. component parts of the select control circuit identical to those shown in FIG. 7 are designated by the same reference numerals. An output conductor from clock pulse generator 330 is connected to respective flip-flop circuits $300_0$, $300_1$ ... $300_n$ through break contacts $410_0$, $410_1$ ... $410_n$ of relay $400_0$, $400_1$... $400_n$.

With this select control circuit, selector switches of subscribers attending the conference are repeatedly energized and deenergized by clock pulses generated by clock pulse generator 330. But when a particular subscriber desires, he depresses his own pushbutton to continue operation of only the selector relay corresponding to that subscriber. For example, when the nth subscriber $10_n$ depresses pushbutton $4_n$, relay $400_n$ is energized to open break contact $410_n$. Accordingly, the sequential switching operation is stopped when the switching operation has proceeded to nth subscriber. Once set, flip-flop circuit $300_n$ continues in this set condition so that gate circuit $310_n$ is preserved in its enabled state to continue the operation of selector relay $320_n$. When the nth subscriber $10_n$ depresses again pushbutton $4_n$, the system is restored to the original condition. The modified select control system is especially suitable for the circumstances wherein the attendants make discussion by charts or data during discussion.

Figure 10:
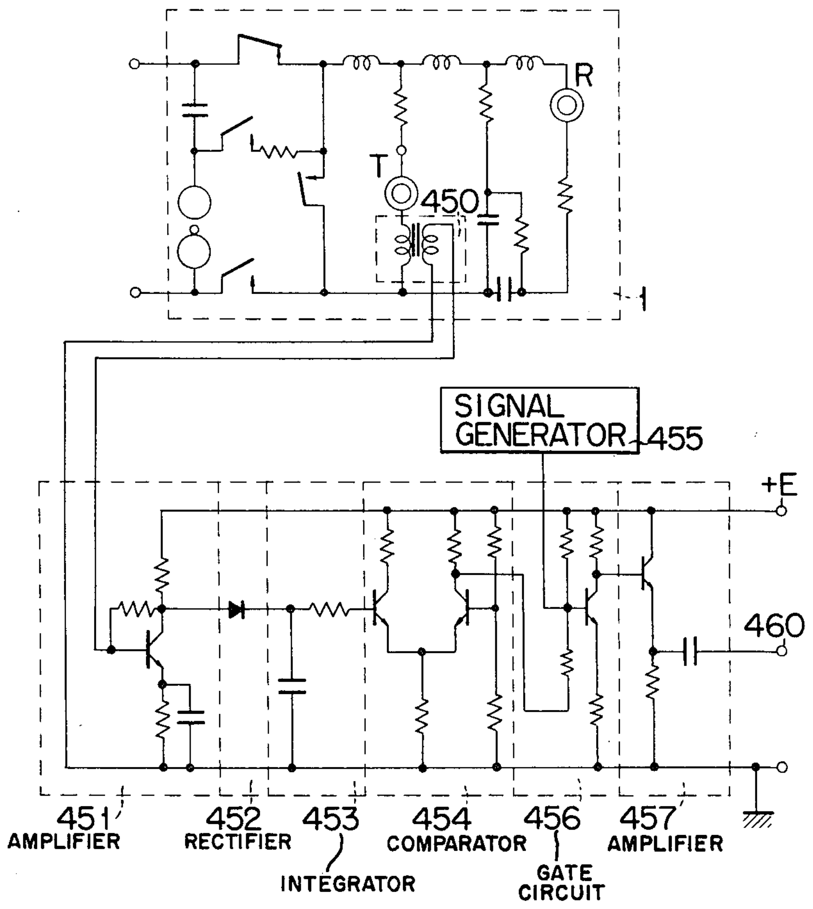
FIGS. 10 and 11 show further modifications of the select control circuit and the connection thereof to terminal equipments.
Figure 11:
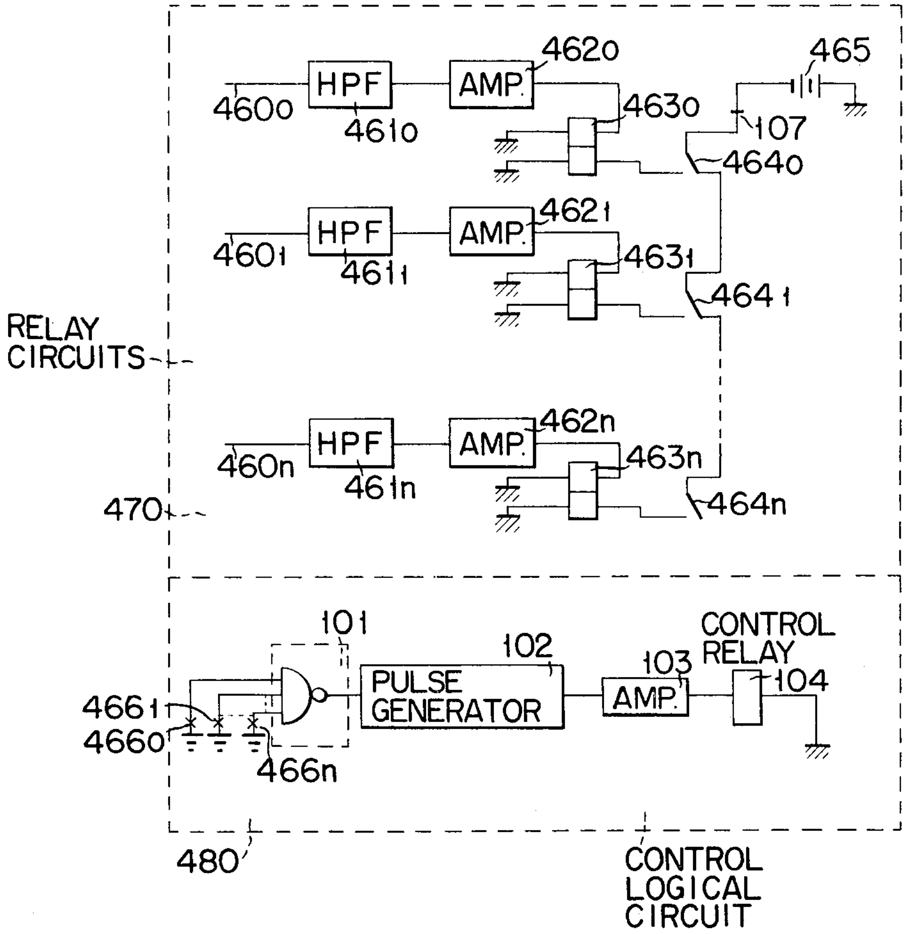

FIGS. 10 and 11 show another embodiment of the terminal equipment and select control circuit. FIG. 10 shows a portion of a terminal equipment comprising a telephone set 1, an audio signal detecting transformer 450, an amplifier 451, a rectifier 452, an integrator 453, a comparator 454, a signal generator 455, a gate circuit 456 and an amplifier 457. When a subscriber speaks, the audio signal is detected by audio signal detecting transformer 450 and is then amplified by amplifier 451. The amplified audio signal is then rectified by rectifier 452 and applied to integrator 453 comprising a condenser and a resistor. The time constant determined by the capacitance of the condenser and the forward resistance of a diode comprising rectifier 452 is selected to such a value at which the comparator 454 in the succeeding stage will not be operated by an impulse and the speech or the audio signal of the subscriber can be accurately identified. This value is selected to be about 1 to 5 seconds, for example. Further, the time constant determined by the condenser and resistor of integrator 453 may be about 5 to 10 seconds. When the voltage of integrator 453 exceeds a predetermined reference voltage, comparator 454 will provide an output signal to enable gate circuit 456. When gate circuit 456 is enabled a pilot signal from a signal generator 455 is amplified by amplifier 457 and is then transmitted to a telephone exchange through an output terminal 460. It is preferable that the frequency of the pilot signal generated by the signal generator by the signal generator 455 is to be outside the audio frequency band and has a value not affecting the video signal, for example 30 kHz.

FIG. 11 illustrates a connection diagram of the modified select control circuit comprising a relay circuit 470 and a control logical circuit 480. Speech indicating lines $460_0$, $460_1$... $460_n$ from respective terminal equipments are connected to operating coils of selector relays $463_0$, $463_1$ ... $463_n$ respectively through high-pass filters $461_0$, $461_1$ ... $461_n$ and amplifiers $462_0$, $462_1$ ... $462_n$. Holding coils of selector relays $463_0$, $463_1$ ... $463_n$ are connected to a source of supply 465 respectively through their own transfer contacts $464_0$, $464_1$ ... $464_n$ and break contact 107 of the control relay 104. Similar to relay circuit 150 of FIG. 3 and relay circuit 250 of FIG. 5, in the relay circuit 470, the order of preferential operation of various selector relays is predetermined. Like the control logical circuit 280 shown in FIG. 3, the control logical circuit 480 shown in FIG. 11 includes a NAND-circuit circuit 101, a pulse generator 102, an amplifier 103 and a control relay 104. When a pilot signal is transmitted to the select control circuit 480 from a terminal equipment via speech indicating circuits $460_0$, for example, the pilot signal will be supplied to amplifier $462_0$ through high-pass filter $461_0$ to be amplified to a value sufficient to operate selector relay $463_0$. When energized, selector relay $463_0$ applies a grounded signal to NAND-circuit 101 through its make contact $466_0$. Thus, the NAND-circuit 101 provides an output signal which is utilized to trigger pulse generator 102 to cause it to generate a pulse having a predetermined pulse width. This pulse is amplified by amplifier 103 to energize control relay 104. When energized, relay 104 opens its break contact 107 to deenergize relay circuit 470. Selector relay $463_0$ is operated to be self held by subsequent pilot signals transmitted from the terminal equipment over speech indicating line $460_0$. During self holding, the selector relay $463_0$ functions to connect the video signal line of the given terminal equipment to the input terminal of the video signal distributor. Where a plurality of subscribers call simultaneously, in the same manner as relay circuits 200 and 300 shown in FIGS. 3 and 5 the video signal line of a particular subscriber corresponding to a selector relay having the preference is connected to the input terminal of the video signal distributor.

With this modified select control circuit the call of one subscriber results in the automatic switching of images on all television receivers.

What we claim is:

1. A television conference telephone system for conducting a conference between at least three subscribers comprising:
- at least three subscriber terminals, each subscriber terminal including means for transmitting and receiving audio signals and video signals and means operable by a subscriber for generating control signals indicating an intention to initiate a conference and for causing switching of video signals to those of a subscriber to speak;
- a telephone exchange including:
- means for coupling at least three of said subscriber terminals to the telephone exchange for conducting said conference;
- video signal distributing means; and
- means responsive to said control signals for selecting a particular one of said terminals for connection to the input of said video signal distributing means in accordance with a predetermined preferential order of the subscribers;
- said video signal distributing means being coupled to said selecting means to supply the video signal of said selected particular subscriber terminal to the video receiving means of all subscriber terminals involved in said conference, said video signal distributing means including an amplifier for receiving said video signal from said selected subscriber terminal, and an impedance converter connected to said amplifier and having a plurality of outputs coupled to a respective plurality of lines which in turn are coupled to a respective plurality of subscriber terminals, each of said outputs having a substantially constant output impedance matching the input impedances of the respective lines connected thereto regardless of the number of lines connected thereto, to prevent mismatch to the receiving terminals and to prevent loading of the input video signal.

2. A television conference telephone system according to claim 1 wherein:
- at each of said terminals, said transmitting and receiving means comprises means to transmit and receive an audio signal, and means to transmit a video signal and to receive and display a video signal; and said control signal generating means includes means for generating a signal indicating the intention of a subscriber to speak;
- said selecting means comprises:
- means to interconnect the audio signal lines of the subscribers involved in the conference in response to information transmitted from one of said subscriber terminals; and
  - select control means connecting only one of said subscriber terminals to said video signal distributor among a plurality of subscriber terminals which have transmitted signals indicating intention to speak; and said video signal distributing means supplying the video signal transmitted from said selected particular subscriber terminal to all of the subscriber terminals involved in said conference.

3. A television conference telephone system according to claim 2 wherein said select control means comprises:
- means responsive to said signals indicating intention to speak for generating an output pulse having a predetermined pulse width;
- a control switch means operated by said output pulse; and
- selector switch means corresponding to respective subscriber terminals and connected said control switch means, said selector switch means being operable in response to operation of said control switch means to connect only one of said subscriber terminals to said video signal distributor.

4. A television conference telephone system according to claim 3 wherein said select control means further comprises means to delay the pulse generated by said pulse generator means, and means responsive to the output pulse from said delay means to cause said pulse generator to stop generation of said pulse.

5. A television conference telephone system according to claim 3 wherein said control switch means and selector switches are comprised of relays.

6. A television conference telephone system according to claim 3 wherein said select control means includes means for preventing, for a predetermined period of time which is substantial as compared to the switching times involved, video signals from being switched into those of another subscriber by the video control signals of said another subscriber.

7. A television conference telephone system according to claim 2 wherein said means for generating a signal indicating intention to speak comprises a switch.

8. A television conference telephone system according to claim 1 wherein:
- at each of said terminals, said transmitting and receiving means comprises means to transmit and receive an audio signal, and means to transmit a video signal and to receive and display a video signal; and said control signal generating means includes means for generating a signal indicating the speech of a subscriber;
- said selecting means comprises:
  - means to interconnect the audio signal lines of the subscriber involved in the conference in response to information transmitted from one of said subscribe terminals; and
  - select control means connecting only one of said subscriber terminals to said video signal distributor among a plurality of subscriber terminals which have transmitted signals indicating speech; and
- said video signal distributing means supplying the video signal transmitted from said selected particular subscriber terminal to all of the subscriber terminals involved in said conference.

9. A telephone conference telephone system according to claim 8 wherein said means to transmit said signal indicating speech of a subscriber comprises an audio signal detector to detect the speech of a subscriber; an integrator to integrate the signal from said audio signal detector; a comparator to compare the output signal of said integrator with a reference signal; and a pilot signal generator operated by the output signal from said comparator.

10. A television conference telephone system for conducting a conference between at least three subscribers comprising:
- at least three subscriber terminals, each subscriber terminal including means for transmitting and receiving an audio signal, means for transmitting a video signal, and means to receive and display said video signal;
- a telephone exchange including:
  - means for coupling at least three of said subscriber terminals to the telephone exchange for conducting said conference;
  - video signal distributing means;
- select control means for selecting a particular one on said subscriber terminals for connection to the input of said video signal distributing means successively at predetermined intervals and in accordance with a predetermined preferential order of the subscribers, said select control means comprising a plurality of switch means corresponding to respective subscriber terminals and means to control the operation of said switch means to select respective subscriber terminals;

said video signal distributing means being coupled to said select control means to supply the video signal of a selected subscriber terminal to the video receiving means of all subscriber terminals involved in said conference, said video signal distributing means including an amplifier for receiving said video signal from said selected subscriber terminal, and an impedance converter connected to said amplifier and having a plurality of outputs coupled to a respective plurality of lines which in turn are coupled to a respective plurality of subscriber terminals, each of said outputs having a substantially constant output impedance matching the input impedances of the respective lines connected thereto regardless of the number of lines connected thereto, to prevent mismatch to the receiving terminals and to prevent loading of the input signal.

11. A television conference telephone system according to claim 10 wherein said means to control the operation of said switch means includes a plurality of flip-flop circuits corresponding to respective terminals for controlling said switch means, and a clock pulse generator connected to said flip-flop circuits for generating a clock pulse at predetermined time intervals to reset successively said flip-flop circuits.

12. A television conference telephone system according to claim 10 wherein each one of said terminals further includes means for generating a signal indicating the speech of the subscriber and wherein said select control means includes means to enable one of said switch means responsive to said speech indicating signal.

* * * * *